United States Patent
Hernández et al.

(10) Patent No.: US 9,369,871 B2
(45) Date of Patent: Jun. 14, 2016

(54) REMOTE START SYSTEMS AND METHODS FOR AN ENABLED VEHICLE

(71) Applicant: Q3Smart Ltd., London (GB)

(72) Inventors: Arafat Hernández, Doha (QA); Ruben Gozalo, Barcelona (ES)

(73) Assignee: Q3SMART LTD., London (GB)

(*) Notice: Subject to any disclaimer, the term of this patent is extended or adjusted under 35 U.S.C. 154(b) by 42 days.

(21) Appl. No.: 14/073,115

(22) Filed: Nov. 6, 2013

(65) Prior Publication Data

US 2015/0126176 A1  May 7, 2015

(51) Int. Cl.
*H04M 3/00* (2006.01)
*H04W 12/08* (2009.01)
*G08C 17/02* (2006.01)
(Continued)

(52) U.S. Cl.
CPC ........... *H04W 12/08* (2013.01); *G08C 17/02* (2013.01); *H04M 1/7253* (2013.01); *H04M 1/72533* (2013.01); *H04W 88/02* (2013.01); *B60R 25/04* (2013.01); *F02N 11/087* (2013.01); *F02N 11/12* (2013.01); *G08C 2201/42* (2013.01); *G08C 2201/61* (2013.01); *G08C 2201/93* (2013.01); *H04M 2250/02* (2013.01)

(58) Field of Classification Search
CPC ... F02N 11/12; F02N 11/087; F02N 11/0803; B60R 25/209; B60R 25/04; B60H 1/00657; G08C 17/02; G08C 17/00; G08C 2201/93; G08C 2201/42; G07C 2009/00825; H04M 1/72533; H04M 1/7253; H04M 2250/02; H04M 11/007; H04W 88/02; H04W 28/12; H04W 4/12; H04W 4/20; H04W 68/005; H04W 68/025; H04W 84/027

USPC ........ 455/574, 404.1, 420, 556.1, 419, 414.1, 455/414.2, 415; 701/2, 113, 36, 31.4, 45; 123/179.2, 179.3, 339.14, 179.1; 307/10.6; 340/5.64, 5.61, 12.22, 5.72, 340/13.24, 426.13, 426.36, 426.11, 539.1
See application file for complete search history.

(56) References Cited

U.S. PATENT DOCUMENTS

| | | |
|---|---|---|
| 6,192,236 B1 | 2/2001 | Irvin |
| 2004/0095229 A1 | 5/2004 | Chen |
| 2008/0287074 A1* | 11/2008 | Grunhold .................. 455/90.2 |

(Continued)

FOREIGN PATENT DOCUMENTS

WO   WO-2008/035351   3/2008

OTHER PUBLICATIONS

International Search Report and Written Opinion mailed Mar. 6, 2014 in related Internaionatl Application No. PCT/IB2013/02587, 9 pages.

*Primary Examiner* — Fred Casca
(74) *Attorney, Agent, or Firm* — Squire Patton Boggs (US) LLP

(57) ABSTRACT

Systems and methods for remote controlling of vehicles are described. Systems and methods may include a plug and play device. Systems may include a receiver; a programmable microprocessor in communication with the receiver; and a switch in communication with the programmable microprocessor. The switch may operate one or more systems of the vehicle. The receiver may send a signal to the preprogrammed microprocessor upon receiving an incoming communication from a network. The signal may include a unique user identifier, and the preprogrammed microprocessor may read and process the unique user identifier to control one or more vehicle systems.

14 Claims, 2 Drawing Sheets

(51) Int. Cl.
*H04M 1/725* (2006.01)
*H04W 88/02* (2009.01)
*F02N 11/12* (2006.01)
*F02N 11/08* (2006.01)
*B60R 25/04* (2013.01)

(56) References Cited

U.S. PATENT DOCUMENTS

2009/0177336 A1\* 7/2009 McClellan et al. ............... 701/2
2014/0062686 A1\* 3/2014 Florio ...................... 340/426.18

\* cited by examiner

REMOTE START SYSTEMS AND METHODS FOR AN ENABLED VEHICLE

FIELD OF THE INVENTION

The present invention relates to systems and methods for remote vehicle starting, and, more specifically, to systems and methods for plug and play devices that allow for rapid vehicle starting via a network connection.

BACKGROUND OF THE INVENTION

Car alarms and remote starters have been installed in vehicles both as original equipment and as aftermarket products for a number of years. As originally conceived, these devices had to be wired into the ignition and power systems of vehicles. The aftermarket products often required installation of substantial electrical connections to existing systems plus the installation of various sensors and switches not supplied as original equipment with the vehicle.

In recent years, as vehicles have become more electronic and microprocessor driven, many vehicles systems and controls are included in an integrated electronic system supplied with the vehicle. Certain systems include connections to virtually all vehicle systems from power windows, seats and door locks to alarms, vehicle sensors (tire pressure, water temperature, oil pressure, fuel level, etc.), heating and air conditioning and remote starting. The number and variety of connections within modern vehicles provides opportunities for new and improved controls. Until recently, secure, efficient systems for remotely controlling various vehicle functions over long distances were not available.

Currently available remote start systems are typically either (1) radio frequency (RF) based transmitters or remote control units actuated by the user, or (2) cellular telephone based systems where a user's cellular telephone sends data to a server and the server communicates with the vehicle. For RF systems, the RF signal itself is not secure and is easily intercepted. Furthermore, the primary drawback to RF systems is the limited operable distance between the remote controller and the vehicle. For cellular telephone systems, starting of a vehicle can take between 1-1.5 minutes due to the necessary communication via one or more servers. Security of the one or more servers is also an issue.

Needs exist for improved systems and methods for remote starting of a vehicle with enhanced security, through a network connection.

SUMMARY OF THE INVENTION

Embodiments of the present invention solve many of the problems and/or overcome many of the drawbacks and disadvantages of the prior art by providing systems and methods for remote starting of vehicles.

Embodiments of the present invention may include systems and methods for remote starting of vehicles. The systems and methods may include a receiver; a programmable microprocessor in communication with the receiver; and a switch in communication with the programmable microprocessor. The switch may operate one or more systems of the vehicle. The receiver may send a signal to the preprogrammed microprocessor upon receiving an incoming communication from a network. The signal may include a unique user identifier, and the preprogrammed microprocessor may read and process the unique user identifier to control one or more vehicle systems.

Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE PREFERRED EMBODIMENTS

Figure 1:
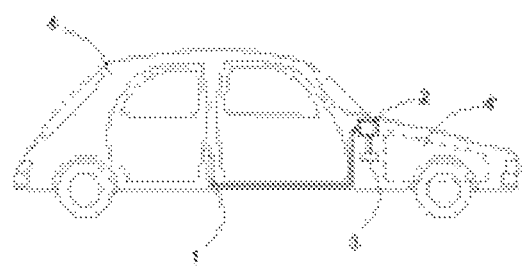
FIG. 1 shows a schematic layout of an exemplary device installed in a vehicle.

Systems and methods are described for using various tools and procedures for remotely starting a vehicle via a network connection. The examples described herein relate to plug and play devices for illustrative purposes only. In certain embodiments, devices may be hardwired into the vehicle or operable through software or combinations of software and hardware devices. The systems and methods described herein may be used for many different industries and purposes. In particular, the systems and methods may be used for any industry or purpose where remotely starting a powered device is needed. For multi-step processes or methods, steps may be performed by one or more different parties, servers, processors, etc. Embodiments described herein relate primarily to engine start/stop instructions for illustrative purposes only. One of ordinary skill in the art would readily understand that any other electronic vehicle system could also be controlled, such as, but not limited to, door lock systems, air conditioning, engine ignition, heating, audio, video, lighting, door movement, window opening or closing, etc.

In certain embodiments, the tools and procedures may be used in conjunction with network devices. In the examples provided herein, cellular telephones and cellular telephone networks are described. Activation of a vehicle, via a plug and play device or otherwise, may be activated by a unique user identifier transmitted via a network connection by one or more of the following:

Receiving a call from a cellular telephone phone;
Receiving a text message, short message service (SMS), or similar message from a cellular telephone;
Receiving a text message or similar message from a personal computer, such as via a VoIP systems, etc.;
Receiving a call from a landline, including a pre-determined land line, such as a home or office telephone number, or through any landline;
Receiving a call through Voice over Internet Protocol (VoIP) or similar systems;
Receiving an email;
Receiving any other data signal; or
By using alternative H2D (Human to Device) network connections that may be developed in the future.

In other words, the device may be activated by using any means that connects and channels communication via a network connection, such as, but not limited to a GSM network a 3G/4G network, etc.

As such, embodiments described herein do not require a smartphone or any particular application. Any computing device or phone may work, including a fixed line. A smartphone and/or application are described herein as they may provide an enhanced user experience with additional functionality.

Plug-and-Play (PnP) devices are well-known and many types of Plug-and-Play standards exist. PnP functionality facilitates the connection of peripheral devices to computing platforms (PCs, servers, robots, vehicle onboard computers, etc.). A PnP device may be one with a specification that facilitates the discovery of a hardware component in a system without the need for physical device configuration or user intervention in resolving resource conflicts. PnP may use several completely automated computer interfaces, e.g., IEEE 1394, PCI, Mini PCI, PCI Express, Mini PCI Express, USB, PCMCIA, PC Card, ExpressCard, etc. In all cases, the interface may require no device configuration by the user as the required software is pre-loaded in the self-configured device.

Embodiments of the present invention may allow users to remotely start a vehicle, which has been enabled for this purpose, via a network connection. Network connections may include, but are not limited to, cellular telephone networks, landline telephone networks, computer networks, fiber optic networks, wireless networks, etc. For purposes of illustration only, the present description describes use of a cellular telephone network and corresponding cellular telephones. A user may remote start the engine of an enabled vehicle from a distance in a safe manner. This may be possible through (i) a pre-programmed Plug and Play (PnP) device previously installed in the vehicle, (ii) an executable program installed in the user's mobile telephone, (iii) software and/or hardware installed in the device or in the vehicle, and (iv) combinations thereof. Note that certain embodiments may not include an executable program or application in a cellular telephone. Preferably, a remote operation may be carried out in less than approximately 30 seconds, more preferably less than approximately 15 seconds, more preferably less than approximately 10 seconds, more preferably, less than approximately 7 seconds, and more preferably less than approximately 5 seconds. A direct connection may be established between a user device, such as a cellular telephone, and a vehicle, including the PnP module, without transferring information via a server to process instructions from the user device to control the vehicle operations.

Although not required, the systems and methods are described in the general context of computer program instructions executed by one or more computing devices that can take the form of a traditional server/desktop/laptop; mobile device such as a smartphone or tablet; etc. Computing devices typically include one or more processors coupled to data storage for computer program modules and data. Key technologies include, but are not limited to, the multi-industry standards of Microsoft and Linux/Unix based Operating Systems; databases such as SQL Server, Oracle, NOSQL, and DB2; Business Analytic/Intelligence tools such as SPSS, Cognos, SAS, etc.; development tools such as Java, .NET Framework (VB.NET, ASP.NET, AJAX.NET, etc.); and other e-Commerce products, computer languages, and development tools. Such program modules generally include computer program instructions such as routines, programs, objects, components, etc., for execution by the one or more processors to perform particular tasks, utilize data, data structures, and/or implement particular abstract data types. While the systems, methods, and apparatus are described in the foregoing context, acts and operations described hereinafter may also be implemented in hardware.

Certain embodiments of the present invention may relate to a method, system and apparatus for controlling a remote start system using a network connection.

Embodiments of the present invention may allow users to conveniently remotely starting/stopping a vehicle's engine, regardless of the current location of the user and of the vehicle. This remote ignition system may allow users to start the engine of an automobile, or other motorized vehicle by engaging the vehicle's ignition system via a network connection, such as through a mobile telephone, and without the user having to physically contact the key with the ignition system.

This may provide users a number of benefits, and it may give users the ability to, among others, (i) start a vehicle remotely to charge the vehicle's battery, even when the vehicle is very far away from the user; or (ii) switch on one or more of the vehicle's systems, such as air conditioning or heating, from home, from the office or elsewhere, to heat or cool the car prior to the driver reaching the vehicle. This is particularly advantageous in places with extreme weather conditions (either cold or hot weather), as this allows the user to conveniently heat or cool the vehicle's cabin prior to reaching the vehicle.

Therefore, some of the uses of this invention may include managing remotely, and through a user device, some of the most commonly used systems in a vehicle including the vehicle's door lock system, air conditioning system, engine ignition system, heating system, audio system, video system, lighting system and/or door movement system.

Consequently, this invention may provide remote starting the engine of an enabled vehicle through a user device in a safe manner, and, regardless of the distance between user and the vehicle itself.

The present invention may relate to a method, system and apparatus for controlling a remote start system via a network connection. One embodiment of the present invention, therefore, may be a mobile telephone loaded with an executable program that allows users to remote start/stop a vehicle's engine, regardless of the current location of the user and of the vehicle. In certain embodiments, an application is not required and operation of the vehicle may be controlled by other input from the user device. The present invention may also relate to a method, system and apparatus for user devices to interact with and control the onboard computer of a vehicle.

A mobile or cellular telephone is a long-range, electronic handset device utilized for mobile or cellular telecommunications (mobile telephony, text messaging and data transmission) over a cellular network of specialized base stations (cell sites). A mobile telephone is not a cordless telephone, as this latter one only offers telephony service within a small range and only through a fixed line.

In certain embodiments, the required mobile telephone may be a mobile smartphone, which is a mobile telephone that offers advanced functionality similar to a personal computer and runs an operating system software package that allows developers to create applications that run on the smartphone operating system. An application may be an executable computer program installed on the smartphone.

As set out above, this remote start device may allow a user to start/stop the engine of an enabled vehicle remotely through his mobile telephone without the user having to physically contact the key with the ignition system. The vehicle may be enabled for this purpose by installing a pre-programmed 'Plug & Play' device in the vehicle.

Figure 2:
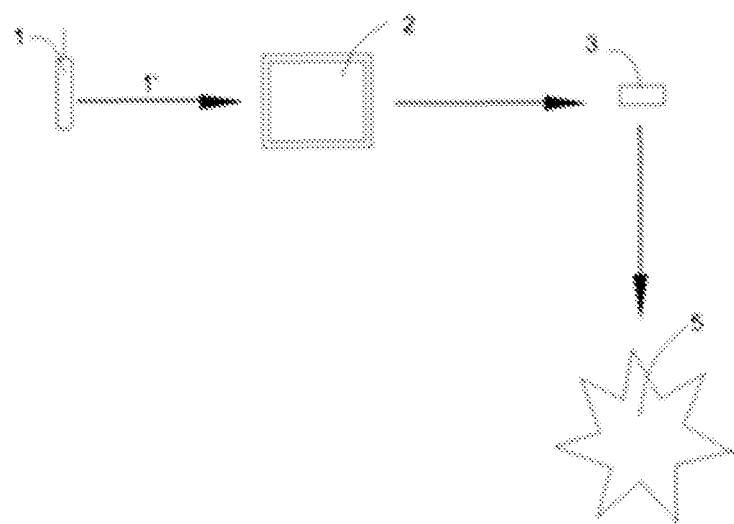
FIG. 2 shows a schematic layout of an exemplary system for remote starting a vehicle.

As shown in FIGS. 1 and 2, the remote start device invention for an enabled vehicle may include: a receiver 1, such as a mobile telephone receiver, and a microprocessor 2. The mobile telephone receiver 1 may be connected to the microprocessor 2 so that when the mobile telephone receiver 1 receives an incoming communication, such as a phone call from user, it may send a signal 1' to the microprocessor 2.

Such signal 1' may include information related to the identification of the user, such as a unique user identifier. The unique user identifier may be, for example, a phone number from where the call was made to the mobile telephone receiver 1, an IP address of the user computer, etc. The microprocessor 2 may also be pre-programmed to recognize one or several specific phone number (the user's mobile number or numbers). For the invention to work for a given vehicle 4, it may be necessary that such vehicle was previously enabled for this purpose, and that a switch 3 must have been previously installed in the vehicle.

The switch 3 may carry out the same tasks as the ignition key and the engine ignition 4, i.e., it may activate an ignition system 5 and start the vehicle 4, including turning on the vehicle's engine 4'. The switch 3 may be a physical switch or an electronic switch. The engine 4' may include a starter motor and spark plugs for vehicles 4 with a gasoline engine 4'.

The microprocessor 2 may be connected to the switch 3. The microprocessor 2 may read the signal 1' coming from the mobile telephone receiver 1, including the phone number from which the mobile telephone receiver 1 receives the call.

Therefore, once the microprocessor 2 receives the signal 1' from the mobile telephone receiver 1 and it reads the phone number that the signal carries, if that phone number is the same as the one previously recorded in the microprocessor 2, it may give an order to turn the switch 3, allowing electric power from the battery of the vehicle 4 to reach the vehicle's ignition system 5 and engine 4' (the starter motor and the spark plugs, in the case of a vehicle 4 with a gasoline engine). Hence, the engine 4' of the vehicle 4 may start.

Once the vehicle 4 starts, it may remain in neutral position.

To implement the aforementioned device invention in a vehicle 4, it may be necessary that the vehicle has been previously enabled for this purpose, including having a switch 3 that allows transmitting electricity to the ignition system 5 of the vehicle's engine 4'. It may also be necessary to specifically enable the vehicle's gearbox so that the gearbox only functions when the vehicle's ignition key is inserted in the vehicle's ignition lock cylinder or for certain vehicles if the key is inside the vehicle's cabin.

For the gearbox to function, and therefore, to enable user to drive the vehicle 4, the ignition key preferably must be inserted in the ignition lock cylinder, or the key must be inside the vehicle's cabin. When this occurs, the ignition key may send a signal to the onboard computer of the vehicle unlocking the gearbox and allowing the user to use and drive the vehicle normally.

The invention described may show relevant configuration and components to carry out the functions detailed above. To perform those tasks, the aforementioned components and constituents or any other suitable ones may be used to perform the same tasks.

The mobile telephone receiver 1, the microprocessor 2, and the switch 3 may be installed and pre-programmed in a Plug and Play (PnP) module that is connected to the vehicle's onboard computer. Software may be pre-loaded in the PnP module so that the module self-configures automatically with the vehicle and, therefore, the user may not need to perform any device configuration or intervene in resolving resource or device conflicts.

The PnP module may establish a direct bi-directional communication channel between a user device and the vehicle. The user may send a signal through a user device, whether a phone call, text message or data signal, directly to the pre-programmed PnP module installed in the vehicle. Therefore, unlike other remote start systems, this invention may not require:

Any radio frequency (RF) transmitter or remote control unit, which when actuated by the user, communicates a remote start command to a vehicle control module via RF receiver located in the vehicle. It should be noted, however, that embodiments of this invention may be compatible with RF transmitters or remote control units that are programmed with the vehicle's onboard computer; or Any computer server where the user has to send any data and whereby such server processes the data and sends a signal to the vehicle.

Moreover, the interface between the PnP module and the user device can incorporate additional security measures, such as passwords, encryption, etc. that can reside either on the phone, the PnP device or both. As per the examples described herein, this pre-programmed PnP module may enable a user to manage remotely, and through a user device, the function of starting a vehicle remotely and controlling one or more vehicle systems, such as switching on the vehicle's air conditioning or heating. Depending on the software pre-loaded in the PnP module, the system may allow a user to manage remotely, and through a user device, such as a mobile phone or smartphone, one or more of the most commonly used systems in a vehicle including the vehicle's door lock system, audio system, video system, lighting system, window systems, atmospheric control, and/or door movement system as the case may be. Additionally, the one or more vehicle systems may be controlled by the user via the user device. For example, the controlling may include turning on and off a vehicle cooling system, but also setting a particular temperature level, fan level, etc. Controls may be implemented through selections with an application, pressing numbers on a keypad, embedding information within a data signal, etc. For certain embodiments, predetermined commands may be programmed into a standard communication. For example, when receiving a call from a predetermined telephone number, the vehicles may do a predetermined set of operations, such as turning the car on, setting the temperature, activating the vehicle lights, etc. The predetermined set of operations may be set by the user ahead of time through an application or other interactive system, such as a website or telephone call-in system.

Various payment solutions may be used with embodiments described herein. In certain embodiments, a one-time cost is charged at purchase of the PnP device. In alternative embodiments, a subscription may be charged over a predetermined period, such as monthly or yearly. The subscription may include unlimited uses or a set number of uses. In alternative embodiments, the PnP device may be provided free of charge, but a fee may be assessed for downloading an application to interface with the PnP device or a subscription fee may be assessed as described above. In certain embodiments, use of the PnP device may be free for the user from a phone usage standpoint. In other words, the phone may dial the PnP device and the device may activate with only a ringtone. Therefore, the PnP device may not "pick up the phone", if the number is recognized, and the PnP device would perform the requested action without incurring a charge from the network operator. Various combinations of one or more of these pricing systems may be used.

Embodiments of the present invention could be implemented differently, as the description herein simply illustrates exemplary methods and systems to remotely start a vehicle's engine through a network connection. Hence, embodiments of the present invention can be achieved by using the most suitable means, components and other equipment, and whereby such constituent parts may be replaced by others that may be equivalent.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

What is claimed is:

1. A system for remotely controlling a vehicle, the system comprising:
    a receiver;
    a programmable microprocessor in communication with the receiver; and
    a switch in communication with the programmable microprocessor, wherein the switch operates one or more systems of the vehicle,
    wherein the receiver sends a signal to the preprogrammed microprocessor upon receiving an incoming communication from a network, wherein the signal comprises a unique user identifier, and wherein the preprogrammed microprocessor reads and processes the unique user identifier to control one or more vehicle systems,
    wherein the programmable microprocessor compares the received unique user identifier with at least one stored unique user identifier,
    wherein when the at least one stored unique user identifier is the same as the received unique user identifier, the programmable microprocessor processes the signal,
    wherein the receiver is a mobile telephone receiver,
    wherein the unique user identifier is one of a telephone number or IP address corresponding to the unique identifier,
    wherein the system is a Plug and Play (PnP) device that is connected to the vehicle, and
    wherein the PnP device establishes a direct bi-directional communication channel between a user device and the vehicle enabling a method of direct interaction between the user device and the vehicle.

2. The system of claim 1, wherein the network is a cellular network.

3. The system of claim 1, wherein the network is a landline telephone network.

4. The system of claim 1, wherein the network is a wireless data network.

5. The system of claim 1, wherein the source of the incoming communication is a unique user identifier.

6. The system of claim 1, wherein the direct bi-directional communication channel allows the user to send requests to the vehicle permitting the user to perform one or more system functions.

7. The system of claim 6, wherein the one or more system functions are starting a vehicle remotely.

8. The system of claim 6, wherein the one or more system functions are selected from the group consisting of: a door lock system, an air conditioning system, a heating system, an audio system, a video system, a lighting system, a door movement system, a window system, and combinations thereof.

9. A non-transitory computer readable medium bearing computer executable instructions for remotely controlling a vehicle comprising:
    receiving a signal, from a user device over a network connection, at a receiver, wherein the signal comprises information regarding a unique user identification;
    communicating the signal from the receiver to a programmable microprocessor;
    reading and processing the information from the signal at the programmable microprocessor; and
    sending instructions to a switch, wherein the switch controls one or more systems of the vehicle,
    wherein the programmable microprocessor compares the received unique user identifier with at least one stored unique user identifier,
    wherein when the at least one stored unique user identifier is the same as the received unique user identifier, the programmable microprocessor processes the signal,
    wherein the receiver is a mobile telephone receiver,
    wherein the source of the incoming communication is a unique user identifier, and wherein the unique user identifier is one of a telephone number or IP address corresponding to the unique identifier,
    wherein the programmable microprocessor is in a Plug and Play (PnP) device that is connected to the vehicle, and
    wherein the PnP device establishes a direct bi-directional communication channel between the user device and the vehicle enabling a method of direct interaction between the user device and the vehicle.

10. The non-transitory computer readable medium of claim 9, wherein the direct bi-directional communication channel allows the user to send requests to the vehicle permitting the user to perform one or more system functions.

11. The non-transitory computer readable medium of claim 10, wherein the one or more system functions are starting a vehicle remotely.

12. The non-transitory computer readable medium of claim 10, wherein the one or more system functions are selected from the group consisting of: a door lock system, an air conditioning system, a heating system, an audio system, a video system, a lighting system, a door movement system, window systems, and combinations thereof.

13. The non-transitory computer readable medium of claim 9, wherein time between sending a signal from the user device to the sending instructions to a switch is less than 15 seconds.

14. The non-transitory computer readable medium of claim 9, wherein the network is a cellular network.

* * * * *